(12) United States Patent
Backus et al.

(10) Patent No.: US 12,333,588 B2
(45) Date of Patent: Jun. 17, 2025

(54) PROGRAMMING VERIFICATION TEMPLATES VISUALLY

(71) Applicant: Plaid Inc., San Francisco, CA (US)

(72) Inventors: John Backus, Miami, FL (US); Faris Toqan, Chicago, IL (US)

(73) Assignee: Plaid Inc., San Francisco, CA (US)

( * ) Notice: Subject to any disclaimer, the term of this patent is extended or adjusted under 35 U.S.C. 154(b) by 273 days.

(21) Appl. No.: 18/194,467

(22) Filed: Mar. 31, 2023

(65) Prior Publication Data

US 2023/0315829 A1    Oct. 5, 2023

Related U.S. Application Data

(60) Provisional application No. 63/362,280, filed on Mar. 31, 2022.

(51) Int. Cl.
| | |
|---|---|
| *G06F 3/0482* | (2013.01) |
| *G06F 3/0481* | (2022.01) |
| *G06F 8/38* | (2018.01) |
| *G06F 9/451* | (2018.01) |
| *G06Q 30/0601* | (2023.01) |

(52) U.S. Cl.
CPC ....... *G06Q 30/0609* (2013.01); *G06F 3/0481* (2013.01); *G06F 3/0482* (2013.01); *G06F 8/38* (2013.01); *G06F 9/451* (2018.02)

(58) Field of Classification Search
CPC ... G06Q 30/0609; G06F 9/451; G06F 3/0481; G06F 3/0482; G06F 8/38
See application file for complete search history.

(56) References Cited

U.S. PATENT DOCUMENTS

| | | |
|---|---|---|
| 2004/0243477 A1 | 12/2004 | Mathai et al. |
| 2011/0047014 A1 | 2/2011 | De Angelo |
| 2013/0159188 A1 | 6/2013 | Andon |
| | (Continued) | |

OTHER PUBLICATIONS

Herve Chabanne et al., A Verifiable System for Automated Face Identification, Sep. 1, 2016, International Conference of the Biometrics Special Interest Group (BIOSIG), pp. 1-5 (Year: 2016).*

(Continued)

*Primary Examiner* — Tam T Tran
(74) *Attorney, Agent, or Firm* — Harrity & Harrity, LLP

(57) ABSTRACT

In some implementations, a verification device may generate a first set of radio buttons associated with a first verification procedure and provide the first set of radio buttons in an area associated with a verification template. The verification device may receive a selection of a configuration for the first verification procedure using the first set of radio buttons. The verification device may generate a second set of radio buttons associated with a second verification procedure and provide the second set of radio buttons in the area associated with the verification template. The verification device may receive a selection of a configuration for the second verification procedure using the second set of radio buttons. Accordingly, the verification device may generate instructions for generating a set of user interfaces based on the selection of the configuration for the first verification procedure and the selection of the configuration for the second verification procedure.

20 Claims, 14 Drawing Sheets

(56) References Cited

U.S. PATENT DOCUMENTS

| | | | |
|---|---|---|---|
| 2016/0142569 A1* | 5/2016 | Akuzawa | H04N 1/00501 |
| | | | 715/734 |
| 2019/0213608 A1 | 7/2019 | Ouyang et al. | |
| 2021/0209606 A1 | 7/2021 | Herlands | |
| 2022/0254045 A1 | 8/2022 | Boardman et al. | |
| 2022/0358434 A1* | 11/2022 | Trivedi | G06Q 10/06313 |
| 2023/0110496 A1* | 4/2023 | Simmons | H04L 63/101 |
| | | | 726/3 |

OTHER PUBLICATIONS

Chetan Arora et al., Automated Checking of Conformance to Requirements Templates Using Natural Language Processing, Oct. 1, 2015, IEEE Transactions On Software Engineering, vol. 41, No. 10, pp. 944-968 (Year: 2015).*

* cited by examiner

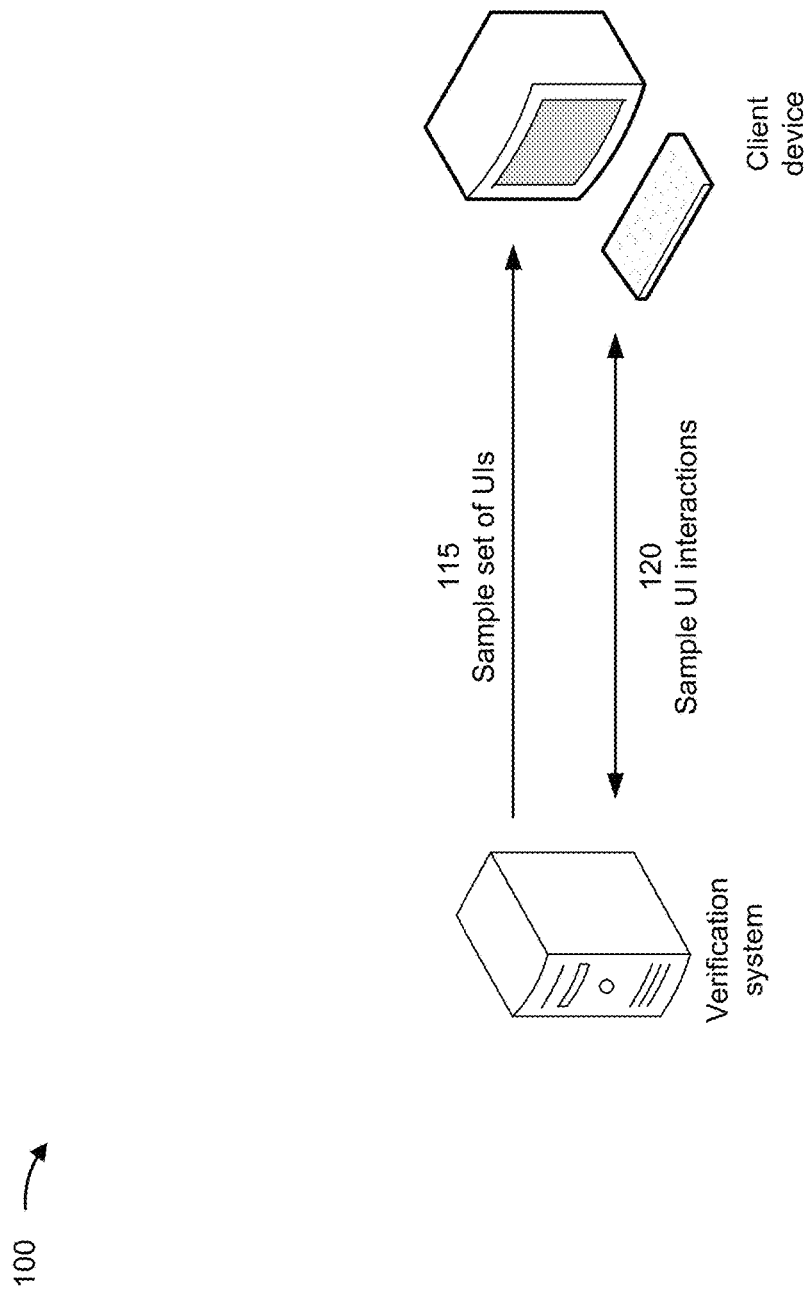

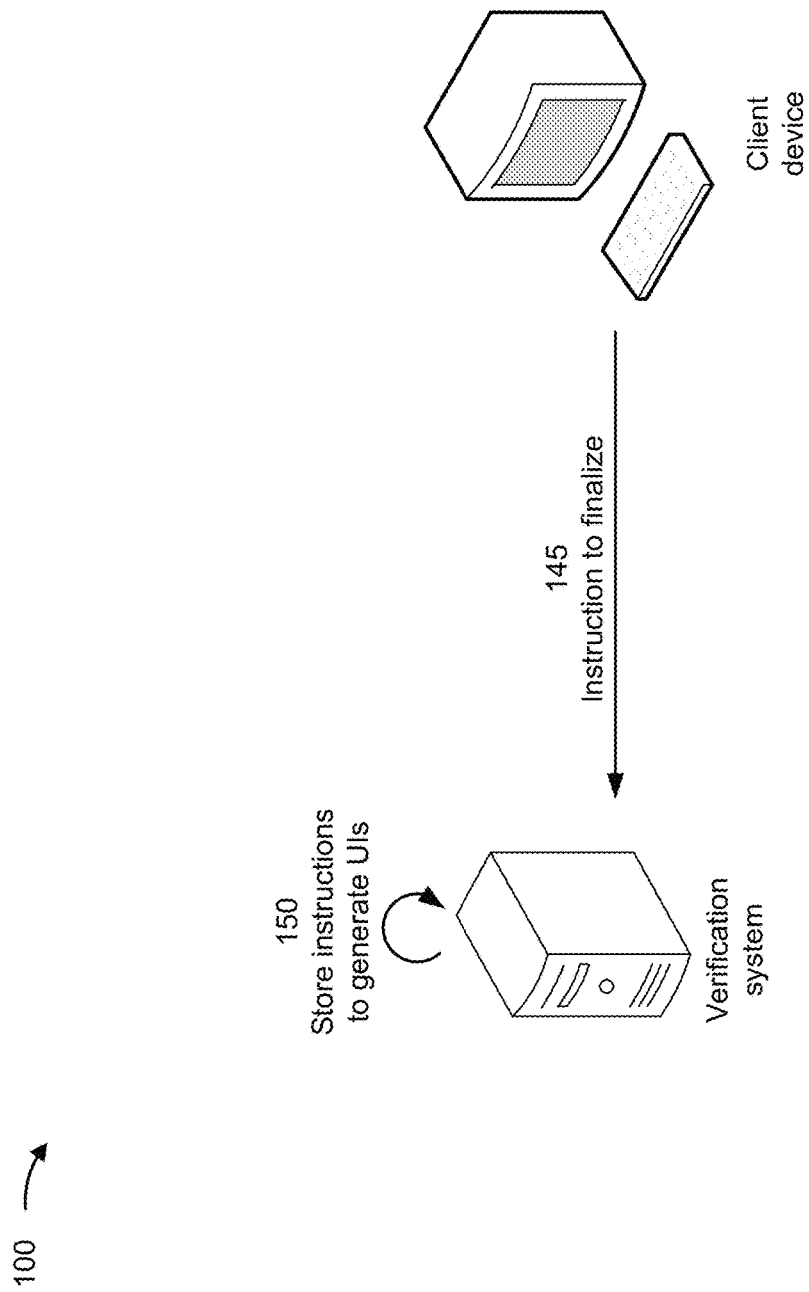

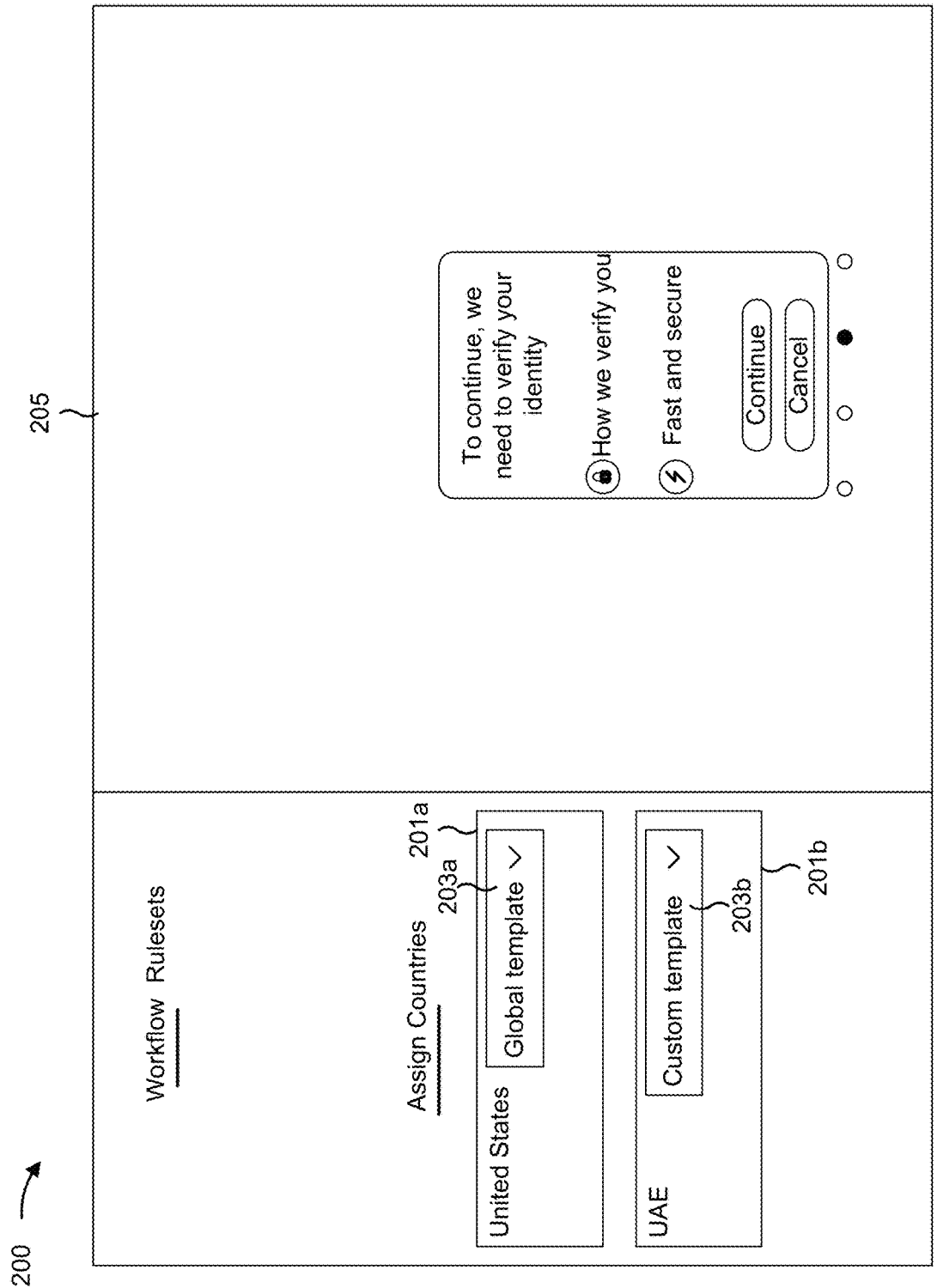

PROGRAMMING VERIFICATION TEMPLATES VISUALLY

CROSS-REFERENCE TO RELATED APPLICATION

This patent application claims priority to U.S. Provisional Patent Application No. 63/362,280, filed on Mar. 31, 2022, and entitled "USER VERIFICATION PROCEDURES AND INTERFACES." The disclosure of the prior application is considered part of and is incorporated by reference into this patent application.

BACKGROUND

Know-your-client (KYC) requirements often impact verification procedures implemented for onboarding new users. For example, different countries may be associated with different KYC requirements.

SUMMARY

Some implementations described herein relate to a system for providing a visual interface for programming verification templates. The system may include one or more memories and one or more processors communicatively coupled to the one or more memories. The one or more processors may be configured to generate a first set of radio buttons associated with a first verification procedure. The one or more processors may be configured to provide the first set of radio buttons in an area associated with a verification template. The one or more processors may be configured to receive a selection of a configuration for the first verification procedure using the first set of radio buttons. The one or more processors may be configured to generate a second set of radio buttons associated with a second verification procedure. The one or more processors may be configured to provide the second set of radio buttons in the area associated with the verification template. The one or more processors may be configured to receive a selection of a configuration for the second verification procedure using the second set of radio buttons. The one or more processors may be configured to generate a sample set of user interfaces (UIs) based on the selection of the configuration for the first verification procedure and the selection of the configuration for the second verification procedure. The one or more processors may be configured to provide the sample set of UIs adjacent to the area associated with the verification template. The one or more processors may be configured to receive an interaction with an element of the sample set of UIs. The one or more processors may be configured to modify the sample set of UIs based on the interaction.

Some implementations described herein relate to a method of providing a visual interface for programming verification templates. The method may include generating, by a verification device, a first set of radio buttons associated with a first verification procedure. The method may include providing, by the verification device, the first set of radio buttons in an area associated with a verification template. The method may include receiving, at the verification device, a selection of a configuration for the first verification procedure using the first set of radio buttons. The method may include generating, by the verification device, a second set of radio buttons associated with a second verification procedure. The method may include providing, by the verification device, the second set of radio buttons in the area associated with the verification template. The method may include receiving, at the verification device, a selection of a configuration for the second verification procedure using the second set of radio buttons. The method may include generating, by the verification device, instructions for generating a set of UIs based on the selection of the configuration for the first verification procedure and the selection of the configuration for the second verification procedure. The method may include transmitting, to a user device, at least a portion of the instructions for generating the set of UIs.

Some implementations described herein relate to a non-transitory computer-readable medium that stores a set of instructions for providing a visual interface for programming verification templates for a device. The set of instructions, when executed by one or more processors of the device, may cause the device to generate a first set of radio buttons associated with a first verification procedure. The set of instructions, when executed by one or more processors of the device, may cause the device to provide the first set of radio buttons. The set of instructions, when executed by one or more processors of the device, may cause the device to receive a selection of a configuration for the first verification procedure using the first set of radio buttons. The set of instructions, when executed by one or more processors of the device, may cause the device to generate a second set of radio buttons associated with a second verification procedure. The set of instructions, when executed by one or more processors of the device, may cause the device to provide the second set of radio buttons. The set of instructions, when executed by one or more processors of the device, may cause the device to receive a selection of a configuration for the second verification procedure using the second set of radio buttons. The set of instructions, when executed by one or more processors of the device, may cause the device to transmit, to a user device, instructions for generating a set of UIs based on the selection of the configuration for the first verification procedure and the selection of the configuration for the second verification procedure.

BRIEF DESCRIPTION OF THE DRAWINGS

FIGS. 1A-1F are diagrams of an example implementation relating to programming verification templates visually.

FIGS. 2A, 2B, 2C, 2D, and 2E are diagrams of example user interfaces associated with building verification templates.

DETAILED DESCRIPTION

The following detailed description of example implementations refers to the accompanying drawings. The same reference numbers in different drawings may identify the same or similar elements.

Programming verification procedures according to know-your-client (KYC) requirements generally consumes significant power and processing resources. For example, multiple cycles of coding and debugging are used, and each cycle of coding and debugging consumes more power and processing resources.

Some implementations described herein provide for visual interfaces that allow for constructing verification procedures and user interfaces (UIs) to enable the verification procedures. Accordingly, using the visual interfaces conserves memory space, power, and processing resources as compared with using multiple cycles of coding, compiling, and debugging the verification procedures. Additionally, some implementations described herein provide for an area with a sample set of UIs that are interactive in order to test the verification procedures in real time. As a result, memory space, power, and processing resources are conserved as compared with multiple cycles of compiling and debugging in order to test the verification procedures.

FIGS. 1A-1F are diagrams of an example 100 associated with programming verification templates visually. As shown in FIGS. 1A-1F, example 100 includes a verification system, a client device, and a user device. These devices are described in more detail in connection with FIGS. 3 and 4.

Figure 1A:
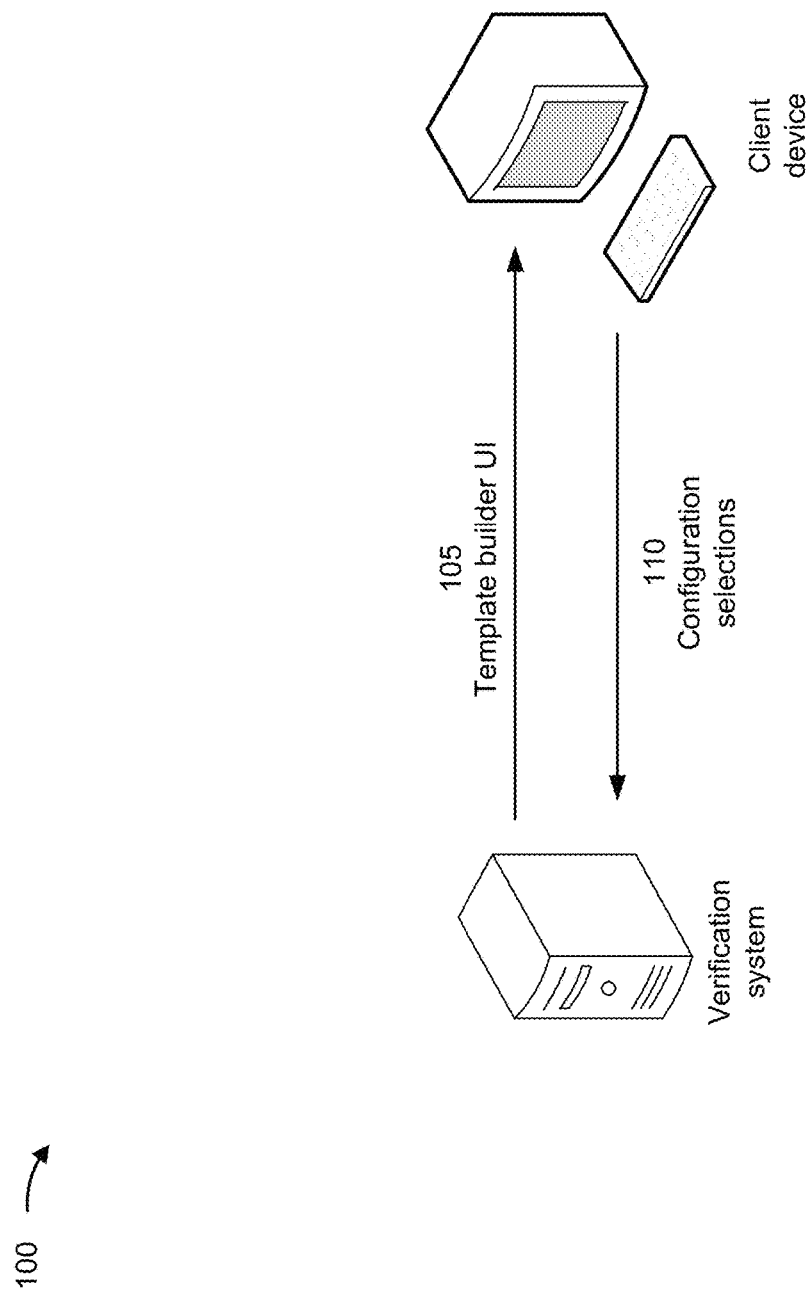

As shown in FIG. 1A and by reference number 105, the verification system may transmit, and the client device may receive, instructions for a UI associated with building a verification template. For example, an administrator may input a command to the client device that causes the client device to transmit a request to the verification system; accordingly, the request may trigger the verification system to transmit the instructions for the UI. The administrator may interact with a UI such that the command is based on the interaction. In some implementations, the administrator may provide credentials (e.g., one or more credentials) to the client device such that the client device transmits the credentials before, or included with, the request.

As described in connection with FIG. 2D, the UI may include a first set of radio buttons and a second set of radio buttons. For example, the first set of radio buttons may be associated with a first verification procedure that is based on information associated with and entered by a user (e.g., a user of the user device). In some implementations, the first verification procedure may be based on information entered by the user (e.g., into input elements) for text-based verification procedures (e.g., one or more text-based verification procedures). The text-based verification procedures may be associated with verification of a location of residence (e.g., against a whitelist and/or a blacklist of locations), a name (e.g., against a ban list, such as a sanction list), or a telephone number (e.g., using a two-factor procedure), among other examples.

Additionally, the second set of radio buttons may be associated with a second verification procedure that is based on biometric data associated with the user. For example, the second verification procedure may be based on a captured image (and/or a captured video) uploaded by the user to the verification system for image-based verification procedures (e.g., one or more image-based verification procedures). The image-based verification procedures may be associated with verification of a selfie of the user (e.g., using a plurality of facial features extracted using a neural network or another type of machine learning model) and/or a video of the user (e.g., using a plurality of features, extracted using a neural network or another type of machine learning model, that detect a heartbeat and/or another indicum of liveness), an image of the document (e.g., using a plurality of features extracted using a neural network or another type of machine learning model) and/or a video of the document (e.g., using a plurality of features, extracted using a neural network or another type of machine learning model, that detect a paper sheen and/or another indicum of liveness), among other examples. Alternatively, the second verification procedure may be based on fingerprint analysis, retina analysis, or another type of biometric analysis.

The verification system may provide, and the client device may show, the first set of radio buttons and the second set of radio buttons in an area associated with the verification template. For example, as shown in FIG. 2D, the first set of radio buttons and the second set of radio buttons may be displayed within a box (e.g., a pop-up box) that is associated with the verification template.

As shown by reference number 110 in FIG. 1A, the client device may transmit, and the verification system may receive, a selection of a configuration for the first verification procedure using the first set of radio buttons. In some implementations, the administrator may interact with the first set of radio buttons (e.g., using a mouse, a touchscreen, a keyboard, and/or another type of input component) in order to select from a plurality of options for text-based verification procedures. For example, as shown in FIG. 2D, the configuration may indicate whether to use the text-based verification procedures and/or how to proceed after the text-based verification procedures. The verification system may therefore generate (or modify) a data structure representing the verification template and based on the selected configuration using the first set of radio buttons.

Additionally, as shown by reference number 110, the client device may transmit, and the verification system may receive, a selection of a configuration for the second verification procedure using the second set of radio buttons. In some implementations, the administrator may interact with the second set of radio buttons (e.g., using a mouse, a touchscreen, a keyboard, and/or another type of input component) in order to select from a plurality of options for image-based verification procedures. For example, as shown in FIG. 2D, the configuration may indicate whether to use the image-based verification procedures and/or what kind of image-based verification procedures to run. The verification system may therefore generate (or modify) a data structure representing the verification template and based on the selected configuration using the second set of radio buttons.

Figure 2B:
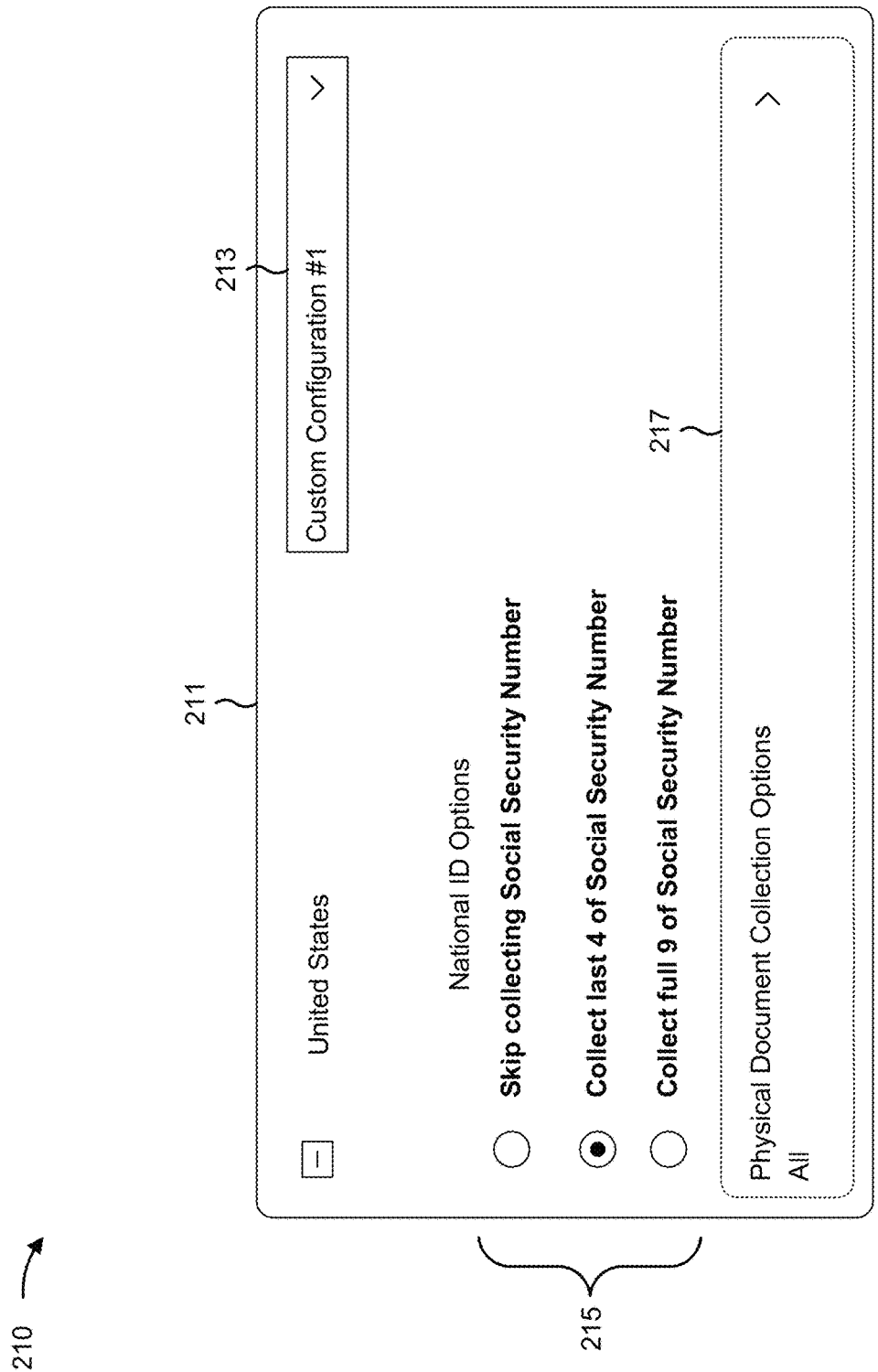
Figure 2C:
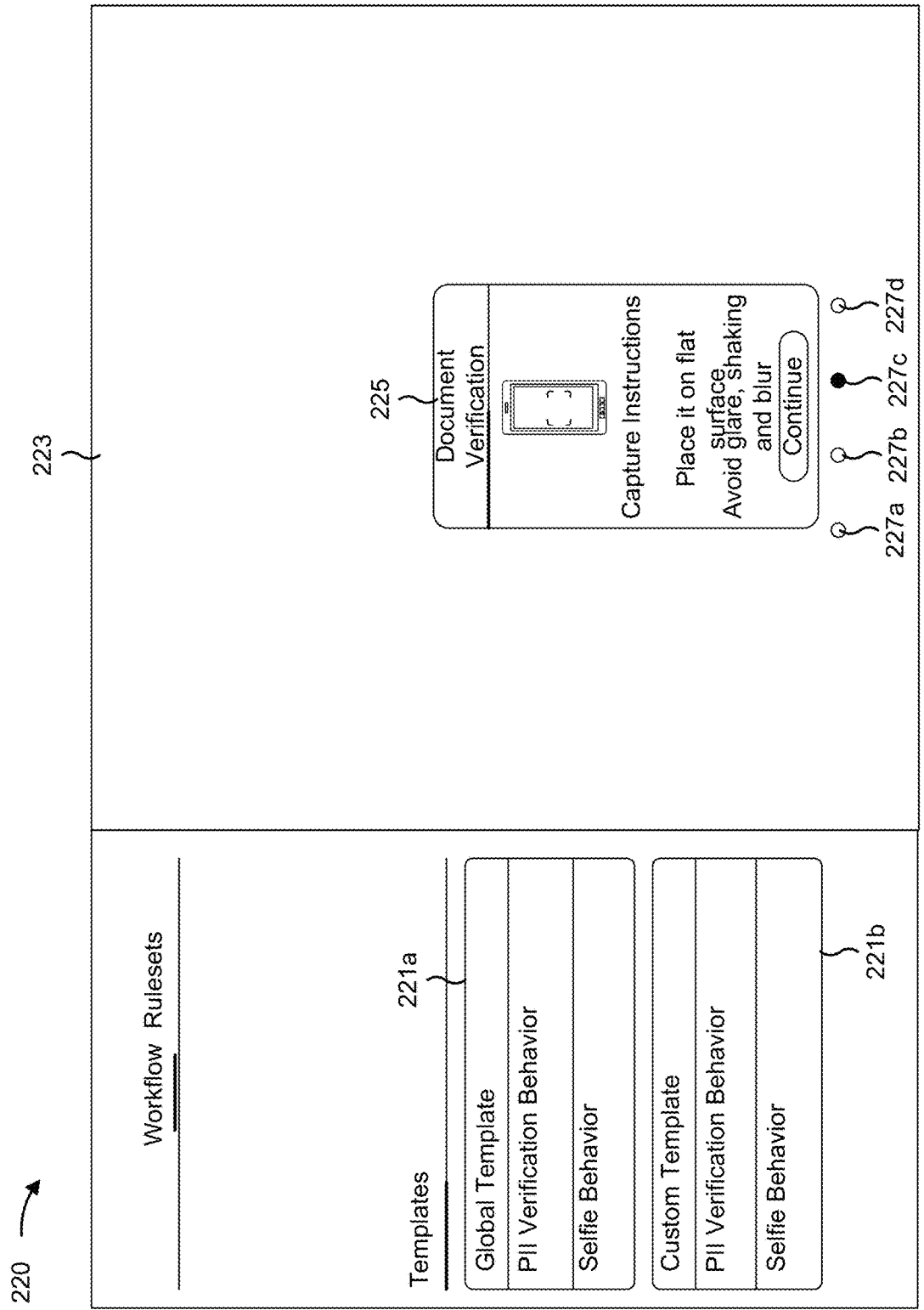
Figure 2D:
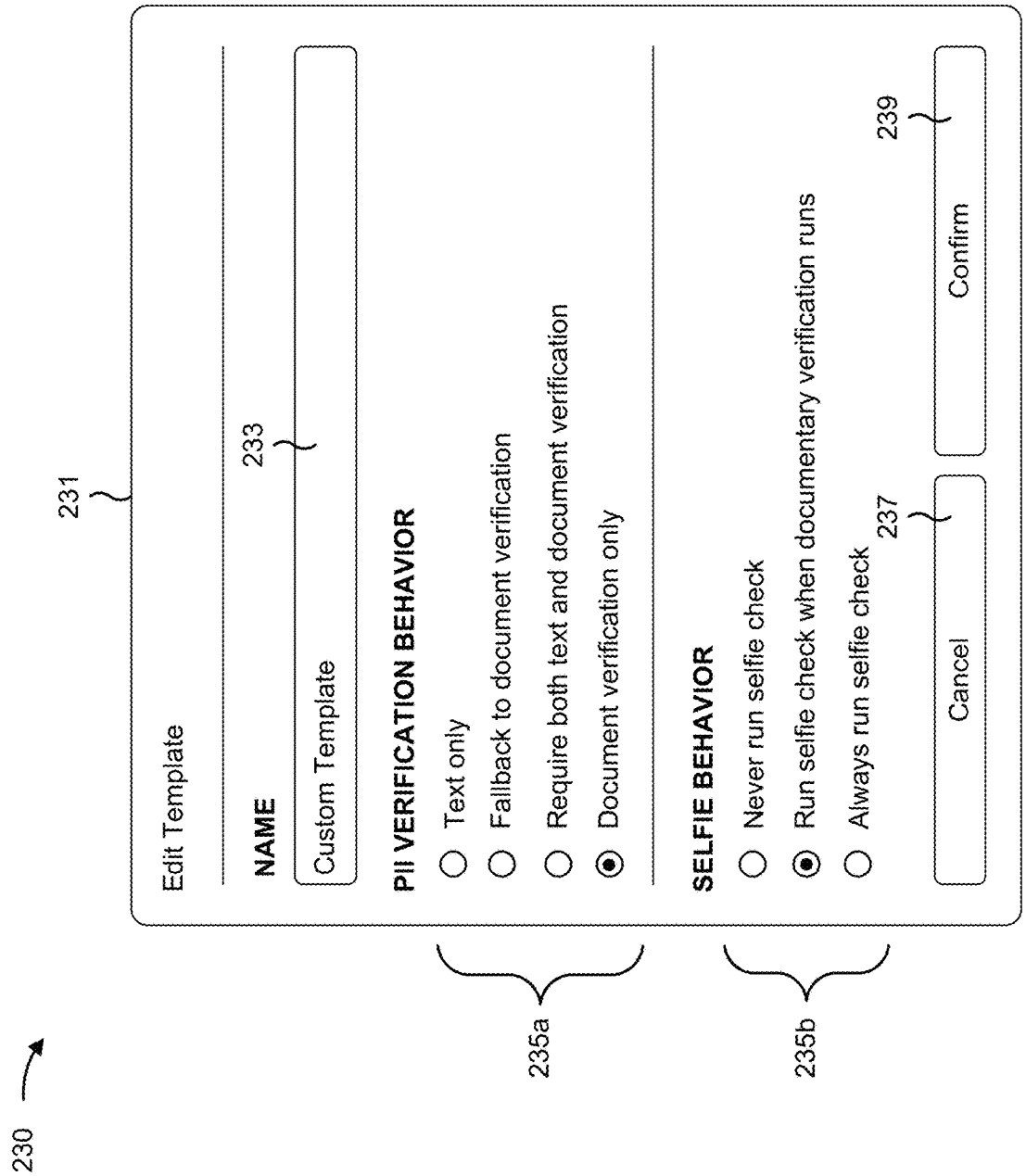

In some implementations, as shown in FIG. 2D, the administrator may interact with a button in order to trigger the client device to transmit indications of the selected configurations to the verification system. Accordingly, the verification system may generate (or modify) the data structure representing the verification template based on the indications from the client device.

As shown in FIG. 1B and by reference number 115, the verification system may generate, and the client device may receive, instructions for a sample set of UIs. The sample set of UIs may be based on the selection of the configuration for the first verification procedure and the selection of the configuration for the second verification procedure. For example, the administrator may input a command to the client device that causes the client device to transmit indications of the selected configurations to the verification system, as described above; accordingly, the indications may trigger the verification system to transmit the instructions for the sample set of UIs.

The verification system may provide, and the client device may show, the sample set of UIs adjacent to an area associated with the verification template. For example, as shown in FIGS. 2A, 2C, and 2D, the sample set of UIs may be displayed within a panel that is adjacent to a panel associated with the verification template.

As shown by reference number 120, the sample set of UIs may be interactive. For example, the client device may transmit, and the verification system may receive, an indication of an interaction with an element of the sample set of UIs. Accordingly, the verification system may modify the sample set of UIs based on the interaction. In one example, as described in connection with FIG. 2E, the administrator may enter input (e.g., by selecting from a drop-down menu or entering text into a text box, among other examples), and the sample set of UIs may accept the input to simulate how the sample set of UIs would function on the user device. In another example, as shown in FIG. 2C, the administrator may select different portions of the sample set of UIs to view before interacting with the selected portion. In one example, as shown in FIG. 2C, the administrator may interact with a button of the sample set of UIs in order to progress from a first UI to a second UI, as the user of the user device would.

Figure 1C:
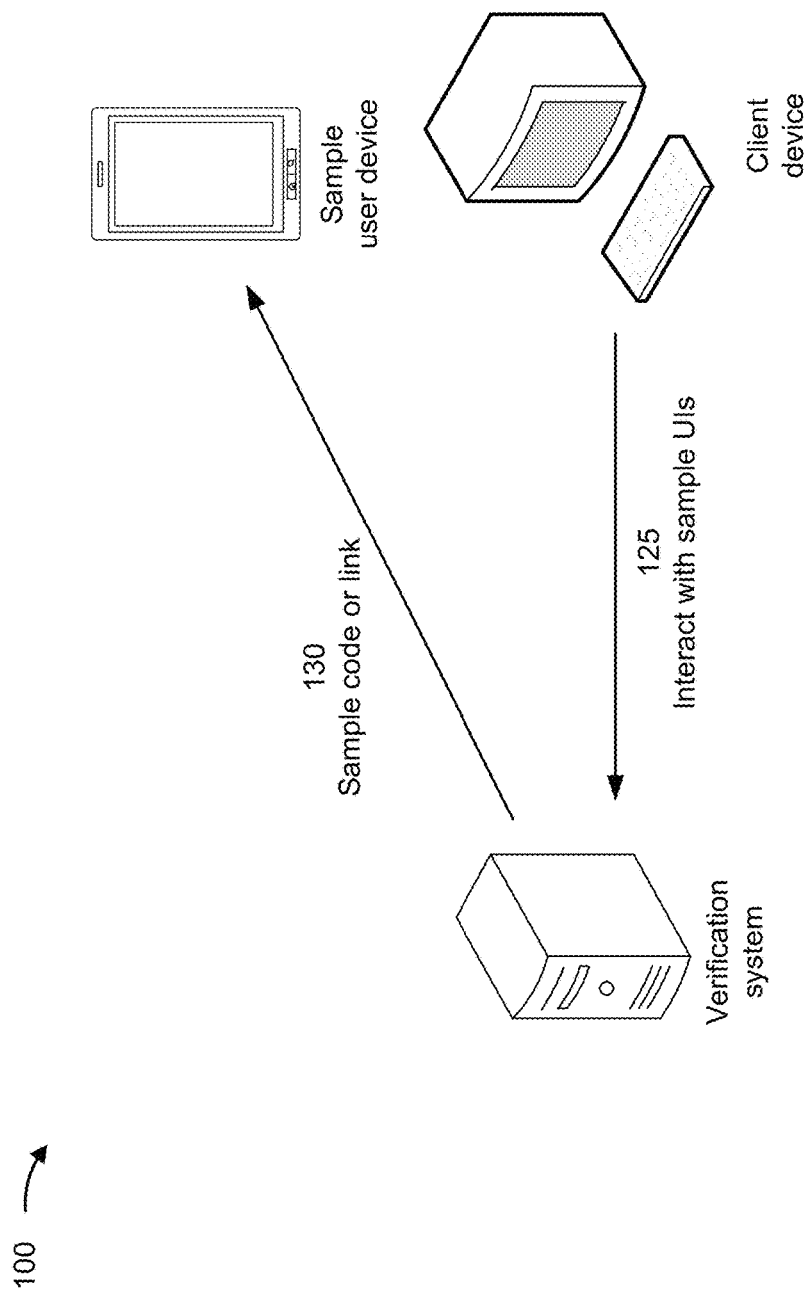
Figure 2E:
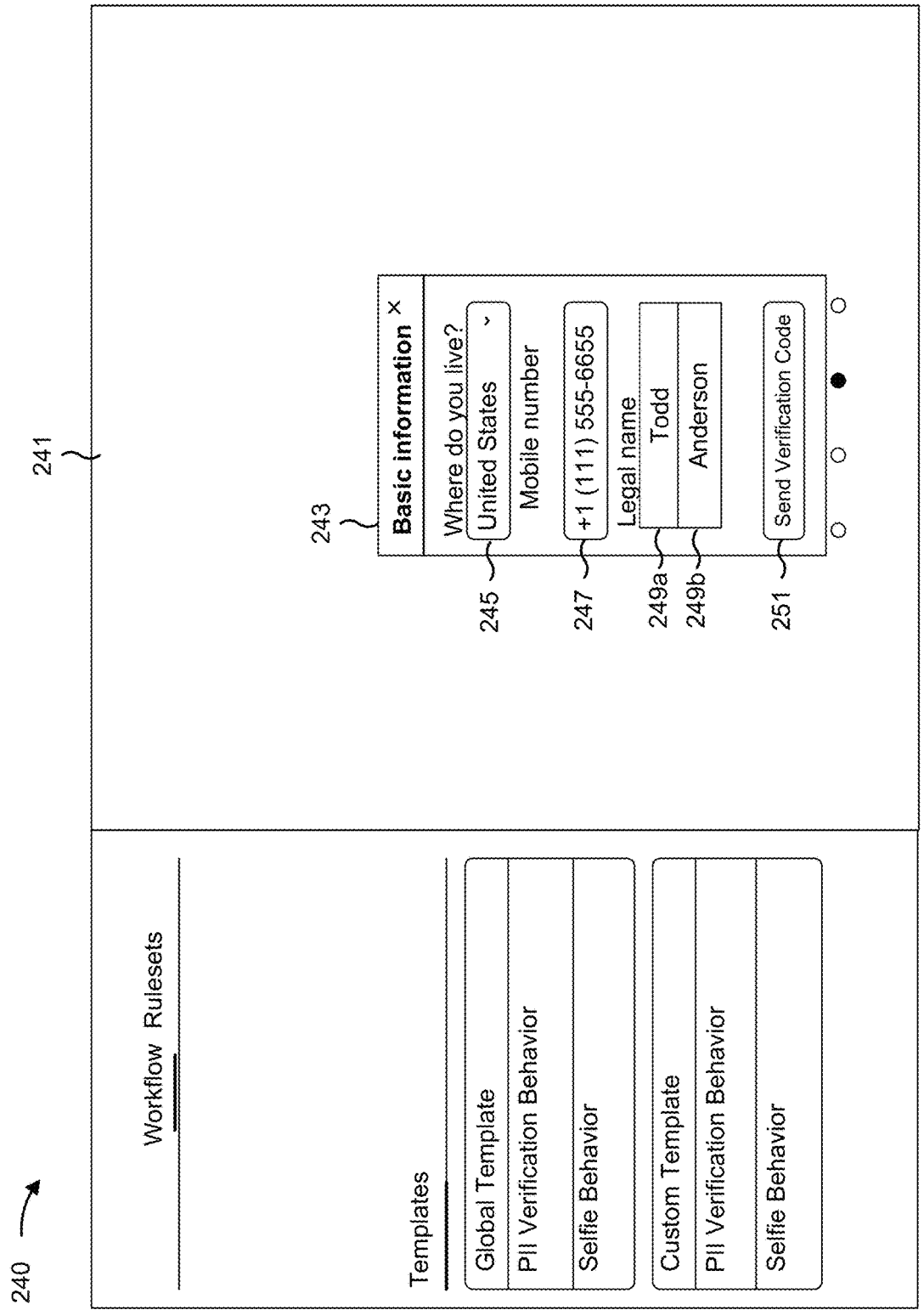

As shown in FIG. 1C and by reference number 125, the client device may transmit, and the verification system may receive, an indication of an interaction with an element of the sample set of UIs. The element may be associated with the second verification procedure or another type of verification procedure performed on a user device with an optical sensor. For example, as shown in FIG. 2E, the administrator may provide a telephone number by providing input for a text box of the sample set of UIs. In another example, the administrator may provide an email address by providing input for a text box of the sample set of UIs.

Accordingly, as shown by reference number 130, the verification system may transmit, and the user device may receive, a message. For example, the verification system may transmit a text message, an email, or another type of message. The message may include a code for entry into the sample set of UIs. Accordingly, the administrator may confirm, using the user device, that a two-factor verification procedure is working. In another example, the message may include a link (e.g., a uniform resource locator (URL) or an application programming interface (API) endpoint, among other examples) that directs the user device to an additional sample set of UIs. The link may trigger the user device to show UIs associated with image-based verification procedures, such as the one described in connection with FIG. 2C. Accordingly, the administrator may confirm, using the user device, that an image-based verification procedure is working.

Figure 1D:
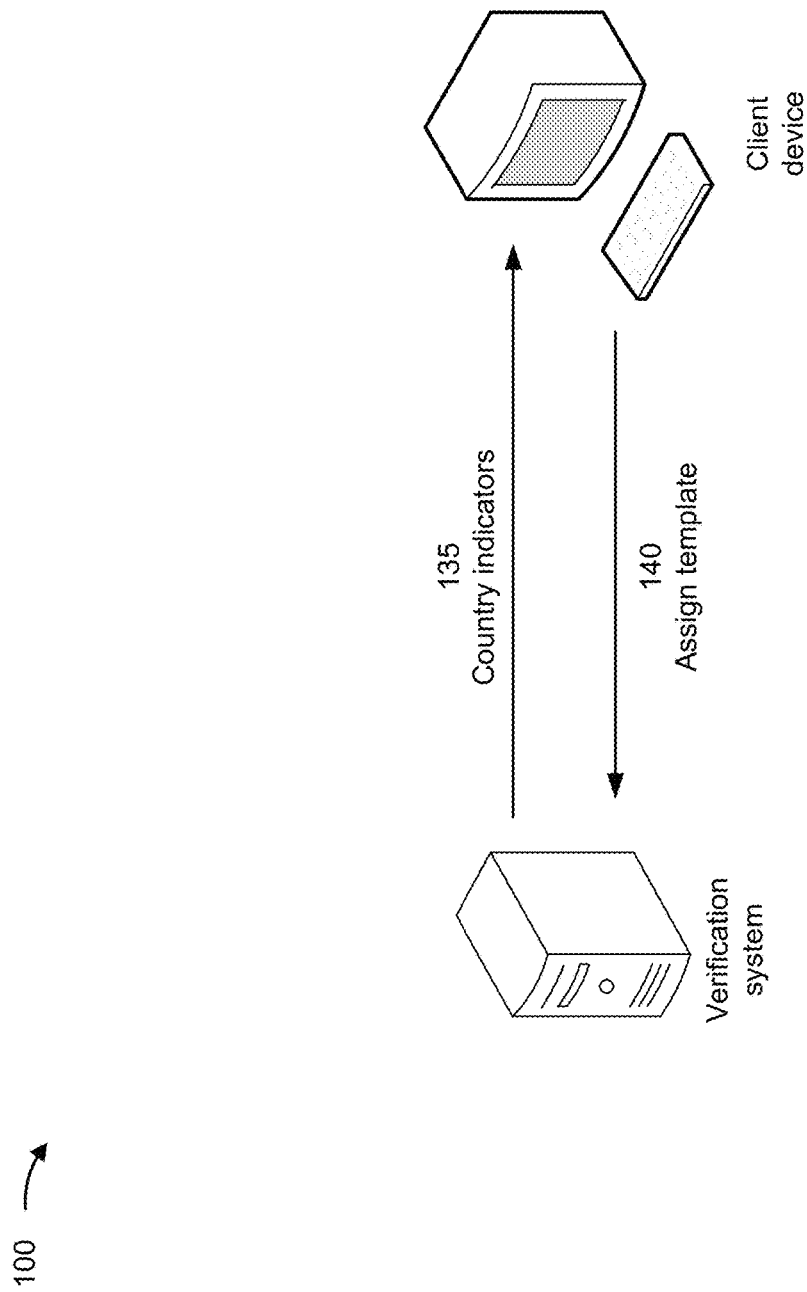

As shown in FIG. 1D and by reference number 135, the verification system may generate, and the client device may receive, instructions for a UI with a plurality of visual elements, each visual element being associated with a corresponding country from a plurality of countries. As described in connection with FIG. 2A, each visual element may include a selection element used to associate a verification template (e.g., the verification template configured in connection with FIG. 1A) with a selected country.

The verification system may provide, and the client device may show, the plurality of visual elements adjacent to the sample set of UIs. For example, as shown in FIG. 2A, the plurality of visual elements may be displayed in a panel adjacent to the area including the interactive sample set of UIs.

As shown by reference number 140, the client device may transmit, and the verification system may receive, an indication to associate the verification template with a selected country (from the plurality of countries) based on a selection of a visual element (of the plurality of visual elements). In some implementations, the administrator may interact with the visual element (e.g., using a mouse, a touchscreen, a keyboard, and/or another type of input component) in order to select from a plurality of possible verification templates. For example, as shown in FIG. 2A, the visual element associated with the selected country may list multiple possible verification templates. The verification system may therefore store an association between the data structure representing the verification template and an indicator of the selected country.

In some implementations, based on interaction with one of the plurality of visual elements, the verification system may generate, and the client device may receive, instructions for a UI with additional visual input elements (e.g., one or more additional visual input elements) associated with the first verification procedure. As described in connection with FIG. 2B, the additional visual input elements may include radio buttons associated with a configuration for the first verification procedure. The verification system may provide, and the client device may show, the radio buttons in an area associated with the selected country. For example, as shown in FIG. 2B, the radio buttons may be displayed within a box (e.g., a pop-up box) that is associated with the selected country.

The client device may transmit, and the verification system may receive, a selection of a configuration for the first verification procedure using the radio buttons. In some implementations, the administrator may interact with the radio buttons (e.g., using a mouse, a touchscreen, a keyboard, and/or another type of input component) in order to select from a plurality of options for text-based verification procedures. For example, as shown in FIG. 2B, the configuration may indicate how to collect a national identity (ID) number and/or whether to perform a two-factor verification procedure. Accordingly, the verification system may modify a data structure (associated with the selected country and/or the verification template) to indicate a modification to the first verification procedure based on the interaction with the additional visual input elements.

Additionally, or alternatively, the verification system may generate, and the client device may receive, instructions for a UI with additional visual input elements (e.g., one or more additional visual input elements) associated with the second verification procedure. As described in connection with FIG. 2B, the additional visual input elements may include a selector associated with a configuration for the second verification procedure. The verification system may provide, and the client device may show, the selector in an area associated with the selected country. For example, as shown in FIG. 2B, the selector may be displayed within a box (e.g., a pop-up box) that is associated with the selected country.

The client device may transmit, and the verification system may receive, a selection of a configuration for the second verification procedure using the selector. In some implementations, the administrator may interact with the selector (e.g., using a mouse, a touchscreen, a keyboard, and/or another type of input component) in order to select from a plurality of options for image-based verification procedures. For example, the configuration may indicate what type of documents to collect and/or whether to perform a selfie verification procedure. Accordingly, the verification system may modify a data structure (associated with the selected country and/or the verification template) to indicate a modification to the second verification procedure based on the interaction with the additional visual input elements.

In some implementations, the client device may transmit, and the verification system may receive, a name associated with the modification. The modification may be the first verification procedure and/or the second verification procedure, as described above. Additionally, the modification may be associated with the instructions for generating the set of UIs. In some implementations, as shown in FIG. 2B, the administrator may interact with a text box (e.g., using a mouse, a touchscreen, a keyboard, and/or another type of input component) in order to provide the name. Accordingly, the verification system may store the modification (e.g., as described above) in association with the name.

As shown in FIG. 1E and by reference number 145, the client device may transmit, and the verification system may receive, an instruction to finalize the verification template. In some implementations, the administrator may interact with a button in order to trigger the client device to transmit a command to finalize the verification template. Accordingly, the verification system may generate (or modify) the data structure representing the verification template based on the command from the client device. In some implementations, the command may additionally trigger the verification system to generate (or modify) data structures representing any modifications to the verification template associated with selected countries (e.g., as described above).

In some implementations, the client device may transmit, and the verification system may receive, a name associated with the verification template (and thus associated with the selection of the configuration for the first verification procedure and the selection of the configuration for the second verification procedure). In some implementations, as shown in FIG. 2D, the administrator may interact with a text box (e.g., using a mouse, a touchscreen, a keyboard, and/or another type of input component) in order to provide the name. Accordingly, the verification system may store the verification template (e.g., as described above) in association with the name.

As shown by reference number 150 in FIG. 1E, the verification system may store instructions for generating the set of UIs in association with the name. For example, the instructions for generating the set of UIs may comprise the data structure representing the verification template (optionally including any modifications per country, as described above). Accordingly, the instructions for generating the set of UIs may be obtained based on the name (e.g., from an index of a database, from a file system such as a new technology file system (NTFS) or an extended files system (ext, ext2, ext3, or ext4), or from a web repository, among other examples).

Figure 1F:
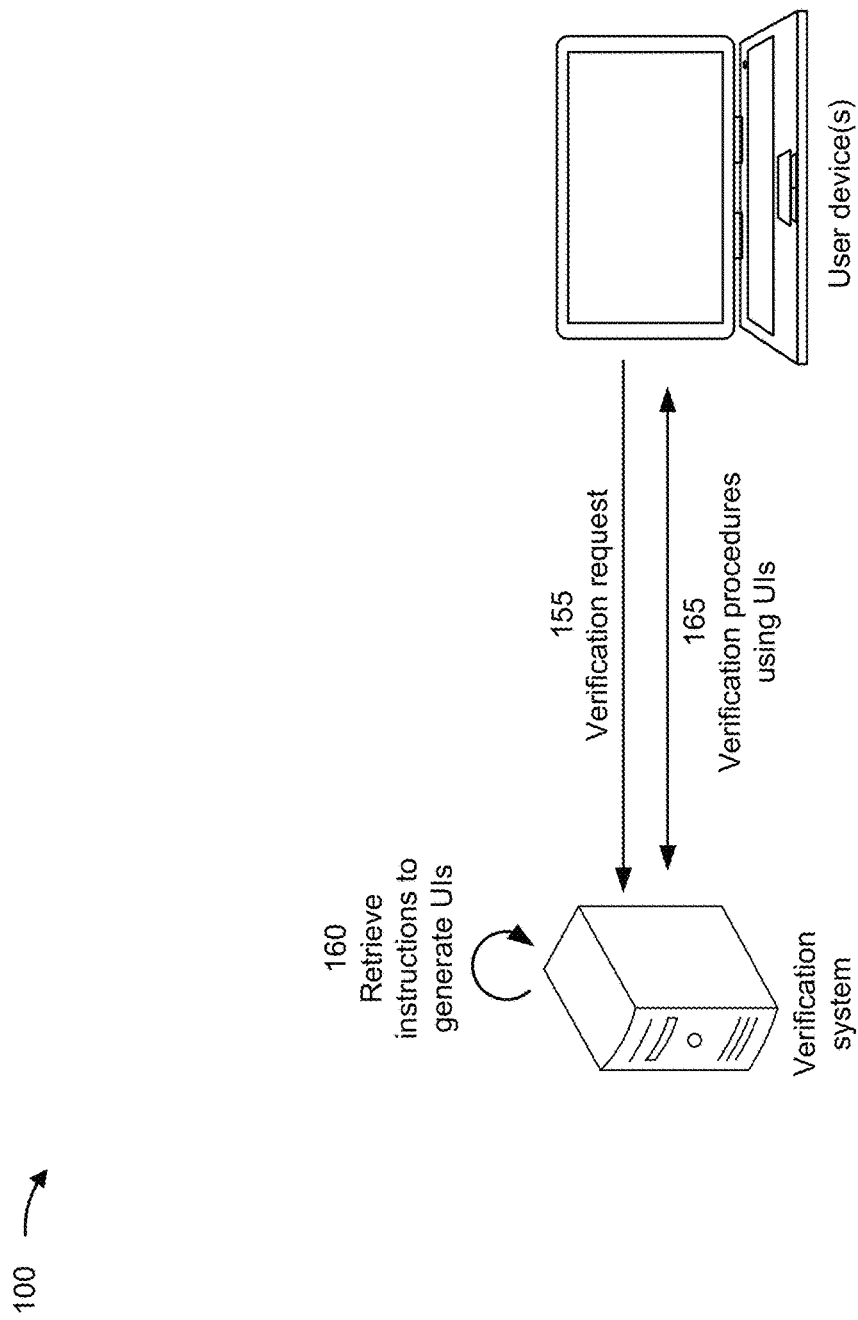

As shown in FIG. 1F and by reference number 155, the user device may transmit, and the verification system may receive, a request for verification. For example, the user of the user device may input a command to the user device that causes the user device to transmit the request to the verification system. The user may interact with a UI such that the command is based on the interaction. In some implementations, the user may provide credentials (e.g., one or more credentials) to the user device such that the user device transmits the credentials before, or included with, the request.

As shown by reference number 160, the verification system may retrieve instructions for generating a set of UIs (e.g., using a name, as described above). In some implementations, the verification system may determine a location of the user device. For example, the verification system may request the location from a cellular network associated with the user device and/or may perform a lookup of the location based on an Internet protocol (IP) address associated with the user device, among other examples. Additionally, or alternatively, the user device may transmit, and the verification system may receive, an indication of the location of the user device. For example, the verification system may request the location from an operating system (OS) of the user device and/or from a sensor of the user device, such as a global positioning system (GPS) sensor or another type of global navigation satellite system (GNSS) sensor.

Accordingly, the verification system may retrieve the instructions for generating the set of UIs based on the location. For example, the verification system may retrieve the data structure representing the verification template associated with a country in which the user device is located. Additionally, in some implementations, the verification system may retrieve a data structure representing modifications to the verification template for the country in which the user device is located.

As shown by reference number 165, the verification system may transmit, and the user device may receive, at least a portion of the instructions for generating the set of UIs. In some implementations, the verification system may perform verification procedures using a plurality of user devices. Accordingly, the verification system may transmit, and an additional user device may receive, at least one additional portion of the instructions for generating the set of UIs.

By using techniques as described in connection with FIGS. 1A-1F, the verification system generates UIs that allow the administrator to construct verification procedures (and UIs to enable the verification procedures). Using the UIs to construct verification procedures conserves memory space, power, and processing resources as compared with multiple cycles of coding, compiling, and debugging the verification procedures. Additionally, the verification system provides the sample set of UIs that are interactive in order to test the verification procedures in real time. As a result, memory space, power, and processing resources are conserved as compared with multiple cycles of compiling and debugging in order to test the verification procedures.

As indicated above, FIGS. 1A-1F are provided as an example. Other examples may differ from what is described with regard to FIGS. 1A-1F.

FIGS. 2A, 2B, 2C, 2D, and 2E are diagrams of example UIs 200, 210, 220, 230, and 240, respectively, associated with building verification templates. Example UIs 200, 210, 220, 230, and 240 may be displayed on a client device, which is described in more detail in connection with FIGS. 4 and 5. For example, the client device may include a desktop computer or a laptop computer and may communicate with a verification system.

As shown in FIG. 2A, the example UI 200 includes a plurality of visual elements associated with a plurality of countries. For example, visual element 201a may be associated with the United States of America, and visual element 201b may be associated with the United Arab Emirates. The visual elements may include text to indicate the corresponding countries, as shown in FIG. 2A. Additionally, or alternatively, the visual elements may include flags and/or other iconography to indicate the corresponding countries. Although depicted with two visual elements, additional visual elements corresponding to additional countries may be included.

As further shown in FIG. 2A, each visual element may include a corresponding drop-down menu (or another type of input element). For example, the visual element 201a includes drop-down menu 203a, and the visual element 201b includes drop-down menu 203b. Accordingly, the drop-down menus may be used to associate verification templates with countries.

The example UI 200 may further include an area 205 associated with a sample set of UIs. The area 205 may function similarly to area 223, as described below in connection with FIG. 2C.

As shown in FIG. 2B, the example UI 210 includes a visual element 211 associated with a selected country. For example, the visual element 211 may be associated with the United States. Additionally, the visual element 211 may include a drop-down menu 213 (or another type of input element) used to associate verification templates with the selected country.

Additionally, as shown in FIG. 2B, the visual element 211 may include visual input elements associated with a verification procedure included in the verification template. For example, the visual element 211 may include a set of radio buttons 215 associated with a first verification procedure that is based on information associated with, and entered by, the user. Accordingly, as shown in FIG. 2B, the set of radio buttons 215 may be associated with selecting a skip configuration, a last 4 digits configuration, or a 9 digits configuration for a national ID number (e.g., a social security number (SSN) for the United States). Additionally, or alternatively, the visual element 211 may include a drop-down menu 217 associated with a second verification procedure that is based on biometric information. For example, the drop-down menu 217 may be associated with selecting a driver's license configuration, a birth certificate configuration, or a passport configuration.

As shown in FIG. 2C, the example UI 220 includes areas associated with verification templates. For example, area 221a may be associated with a verification template currently being modified, and area 221b may be associated with a stored verification template. Although depicted with two areas, additional areas corresponding to additional templates may be included. Each area 221a and 221b may include at least some elements described in connection with FIG. 2D.

As further shown in FIG. 2C, the example UI 220 includes an area 223 adjacent to the area 221a and the area 221b. The area 223 may be delineated by a border, as shown in FIG. 2C. Alternatively, the area 223 may include a group of pixels logically but not visually distinct from a remaining portion of pixels in the example UI 220.

The area 223 may include a sample set of UIs. For example, in FIG. 2C, UI 225 is visible. Other UIs of the sample set of UIs may be made visible using buttons (or other input elements) 227a, 227b, and 227d. In the example UI 220, the button 227c is associated with the UI 225. Additionally, whichever UI in the sample set of UIs is visible (e.g., the UI 225 in FIG. 2C) may be interactive. For example, the verification system may receive an interaction with an element of the UI 225 and modify the UI 225 to demonstrate how the UI 225 would function on a user device.

As shown in FIG. 2D, the example UI 230 includes an area 231 associated with a verification template. The area 231 may be delineated by a border, as shown in FIG. 2D. Alternatively, the area 231 may include a group of pixels logically distinct from a remaining portion of pixels in the example UI 230.

As further shown in FIG. 2D, the area 231 includes a text box 233 (or another type of input element) that accepts a string (e.g., a name) associated with the verification template. For example, a data structure representing the verification template generated via interaction with the example UI 230 may be stored in connection with the string.

The area 231 further includes a first set of radio buttons 235a associated with a first verification procedure and a second set of radio buttons 235b associated with a second verification procedure. The first verification procedure may be based on information associated with, and entered by, the user. For example, as shown in FIG. 2D, the first set of radio buttons 235a may be associated with selecting a text-only configuration, a fallback to document configuration, a text-and-document configuration, or a document-only configuration. Additionally, the second verification procedure may be based on biometric information. For example, as shown in FIG. 2D, the second set of radio buttons 235b may be associated with selecting a "never" configuration, a "conditional" configuration, or an "always" configuration for a selfie check (e.g., based on a photo or a video).

As further shown in FIG. 2D, the area 231 includes a button 237 (or another type of input element) associated with canceling generation of a data structure representing the verification template configured via interaction with the example UI 230. Additionally, the area 231 includes a button 239 (or another type of input element) associated with generating a data structure representing the verification template configured via interaction with the example UI 230. In some implementations, the example UI 230 may be used to modify an existing verification template such that the button 237 is associated with modifying the data structure, representing the existing verification template, according to interaction with the example UI 230.

As shown in FIG. 2E, the example UI 240 includes an area 241 associated with a sample set of UIs. The area 241 may be delineated by a border, as shown in FIG. 2E. Alternatively, the area 241 may include a group of pixels logically but not visually distinct from a remaining portion of pixels in the example UI 240.

In FIG. 2E, UI 243 is visible in the area 241. Other UIs of the sample set of UIs may be made visible using buttons (or other input elements), as described in connection with FIG. 2C. The UI 243 may be interactive. For example, the UI 243 may include a drop-down menu 245 that allows a user to input a country associated with the user. Additionally, the UI 243 may include a text box 247 that allows a user to input a telephone number. Additional input elements (e.g., text boxes 249a and 249b) may allow a user to input a name. The UI 243 may include a button 251 that triggers the verification system to transmit a message to a user device (e.g., based on the telephone number in the text box 247). Accordingly, the verification system may demonstrate how a verification procedure (e.g., a two-factor verification procedure or an image-based verification procedure) would function on the user device.

As indicated above, FIGS. 2A-2E are provided as examples. Other examples may differ from what is described with regard to FIGS. 2A-2E.

Figure 3:
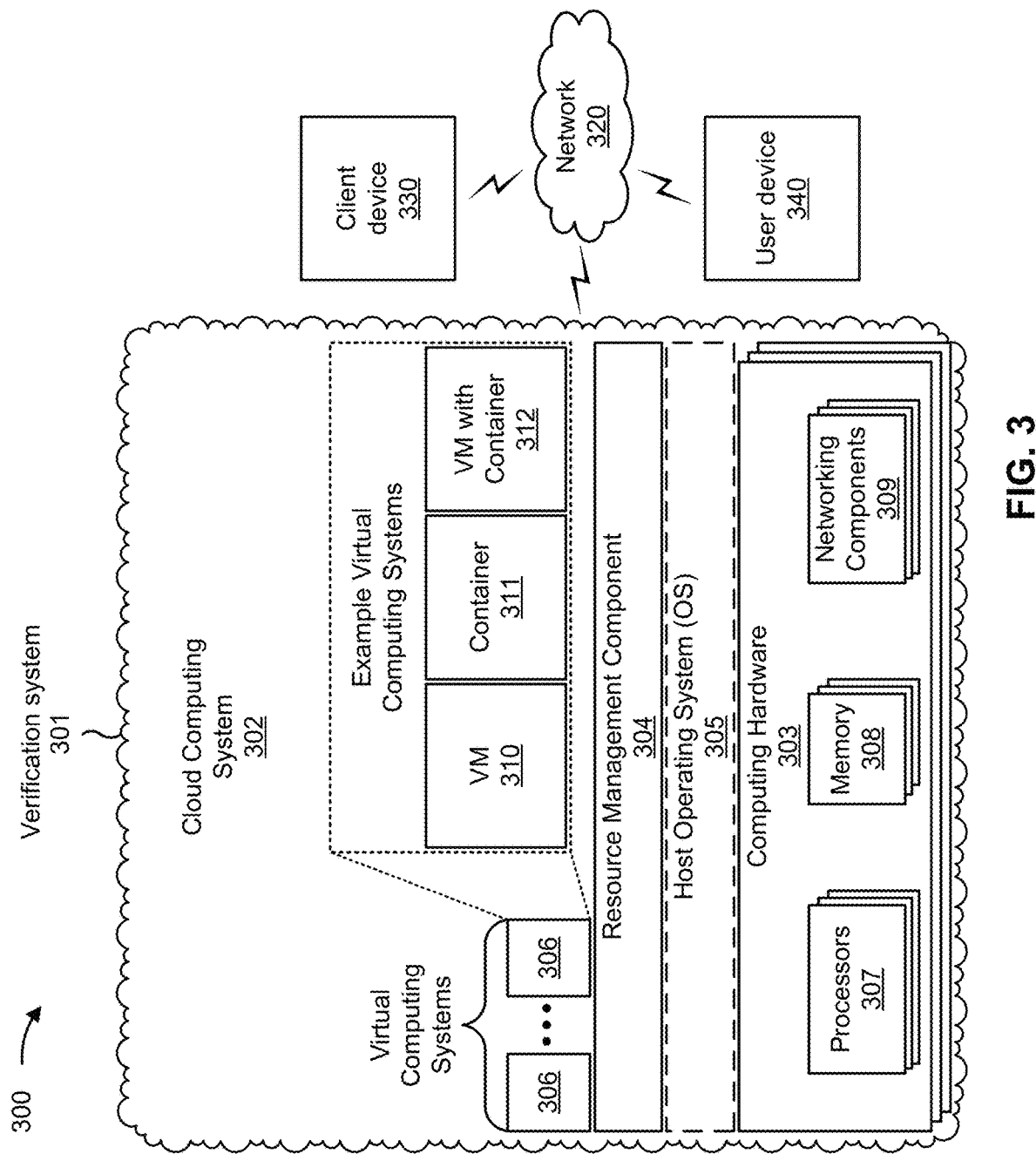
FIG. 3 is a diagram of an example environment in which systems and/or methods described herein may be implemented.

FIG. 3 is a diagram of an example environment 300 in which systems and/or methods described herein may be implemented. As shown in FIG. 3, environment 300 may include a verification system 301, which may include one or more elements of and/or may execute within a cloud computing system 302. The cloud computing system 302 may include one or more elements 303-312, as described in more detail below. As further shown in FIG. 3, environment 300 may include a network 320, a client device 330 and/or a user device 340. Devices and/or elements of environment 300 may interconnect via wired connections and/or wireless connections.

The cloud computing system 302 may include computing hardware 303, a resource management component 304, a host OS 305, and/or one or more virtual computing systems 306. The cloud computing system 302 may execute on, for example, an Amazon Web Services platform, a Microsoft Azure platform, or a Snowflake platform. The resource management component 304 may perform virtualization (e.g., abstraction) of computing hardware 303 to create the one or more virtual computing systems 306. Using virtualization, the resource management component 304 enables a single computing device (e.g., a computer or a server) to operate like multiple computing devices, such as by creating multiple isolated virtual computing systems 306 from computing hardware 303 of the single computing device. In this way, computing hardware 303 can operate more efficiently, with lower power consumption, higher reliability, higher availability, higher utilization, greater flexibility, and lower cost than using separate computing devices.

The computing hardware 303 may include hardware and corresponding resources from one or more computing devices. For example, computing hardware 303 may include hardware from a single computing device (e.g., a single server) or from multiple computing devices (e.g., multiple servers), such as multiple computing devices in one or more data centers. As shown, computing hardware 303 may include one or more processors 307, one or more memories 308, and/or one or more networking components 309. Examples of a processor, a memory, and a networking component (e.g., a communication component) are described elsewhere herein.

The resource management component 304 may include a virtualization application (e.g., executing on hardware, such as computing hardware 303) capable of virtualizing computing hardware 303 to start, stop, and/or manage one or more virtual computing systems 306. For example, the resource management component 304 may include a hypervisor (e.g., a bare-metal or Type 1 hypervisor, a hosted or Type 2 hypervisor, or another type of hypervisor) or a virtual machine monitor, such as when the virtual computing systems 306 are virtual machines 310. Additionally, or alternatively, the resource management component 304 may include a container manager, such as when the virtual computing systems 306 are containers 311. In some implementations, the resource management component 304 executes within and/or in coordination with a host operating system 305.

A virtual computing system 306 may include a virtual environment that enables cloud-based execution of operations and/or processes described herein using computing hardware 303. As shown, a virtual computing system 306 may include a virtual machine 310, a container 311, or a hybrid environment 312 that includes a virtual machine and a container, among other examples. A virtual computing system 306 may execute one or more applications using a file system that includes binary files, software libraries, and/or other resources required to execute applications on a guest operating system (e.g., within the virtual computing system 306) or the host operating system 305.

Although the verification system 301 may include one or more elements 303-312 of the cloud computing system 302, may execute within the cloud computing system 302, and/or may be hosted within the cloud computing system 302, in some implementations, the verification system 301 may not be cloud-based (e.g., may be implemented outside of a cloud computing system) or may be partially cloud-based. For example, the verification system 301 may include one or more devices that are not part of the cloud computing system 302, such as device 400 of FIG. 4, which may include a standalone server or another type of computing device. The verification system 301 may perform one or more operations and/or processes described in more detail elsewhere herein.

The network 320 may include one or more wired and/or wireless networks. For example, the network 320 may include a cellular network, a public land mobile network (PLMN), a local area network (LAN), a wide area network (WAN), a private network, the Internet, and/or a combination of these or other types of networks. The network 320 enables communication among the devices of the environment 300.

The client device 330 may include one or more devices capable of receiving, generating, storing, processing, providing, and/or routing information associated with verification templates, as described elsewhere herein. The client device 330 may include a communication device and/or a computing device. For example, the client device 330 may include a server, such as an application server, a client server, a web server, a database server, a host server, a proxy server, a virtual server (e.g., executing on computing hardware), or a server in a cloud computing system. In some implementations, the client device 330 may include computing hardware used in a cloud computing environment.

The user device 340 may include one or more devices capable of receiving, generating, storing, processing, and/or providing information associated with sample UIs, as described elsewhere herein. The user device 340 may include a communication device and/or a computing device. For example, the user device 340 may include a wireless communication device, a mobile phone, a user equipment, a laptop computer, a tablet computer, a desktop computer, a gaming console, a set-top box, a wearable communication device (e.g., a smart wristwatch, a pair of smart eyeglasses, a head mounted display, or a virtual reality headset), or a similar type of device.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of the environment 300 may perform one or more functions described as being performed by another set of devices of the environment 300.

Figure 4:
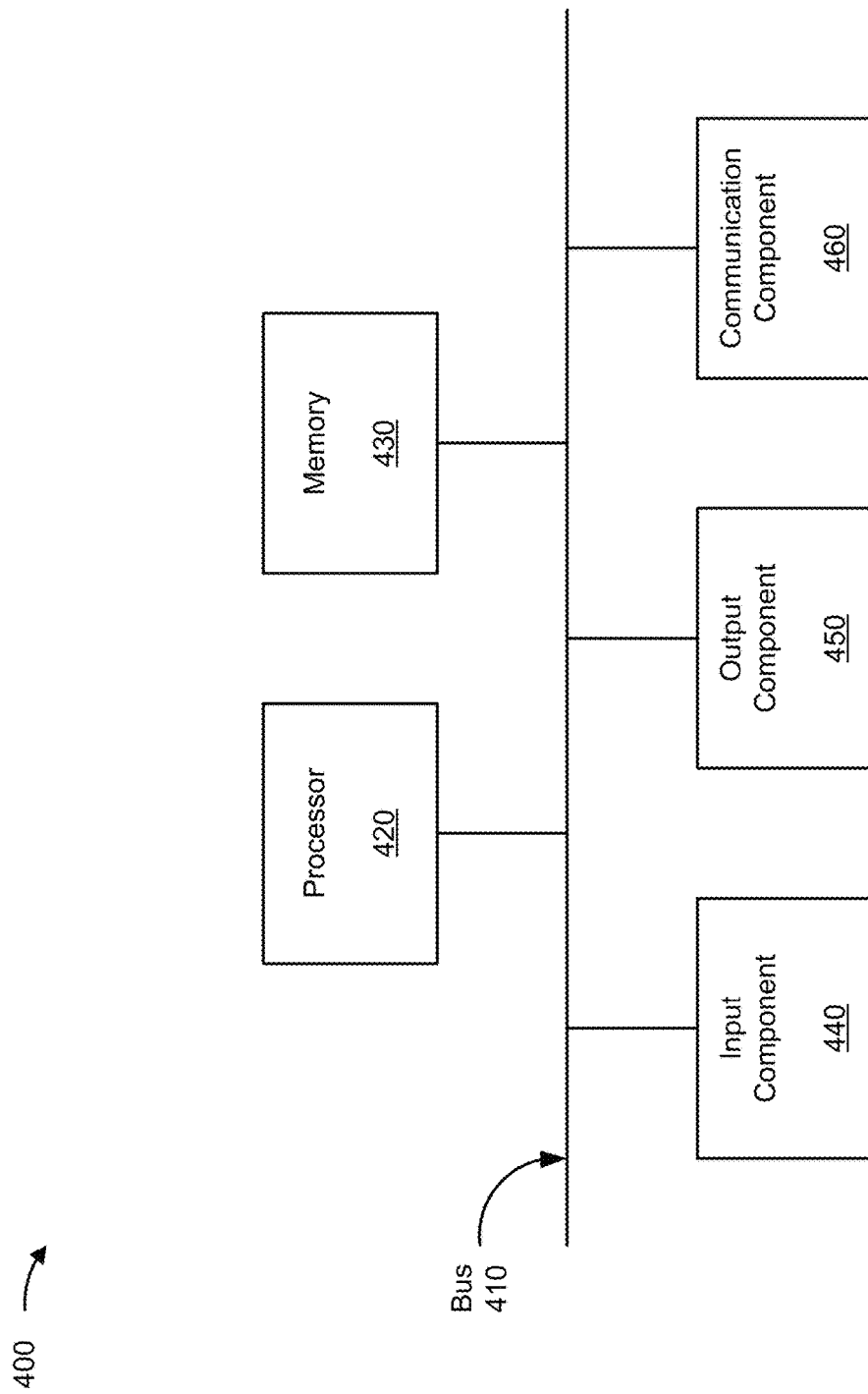
FIG. 4 is a diagram of example components of one or more devices of FIG. 3.

FIG. 4 is a diagram of example components of a device 400 associated with programming verification templates visually. The device 400 may correspond to a client device 330 and/or a user device 340. In some implementations, the client device 330 and/or the user device 340 may include one or more devices 400 and/or one or more components of the device 400. As shown in FIG. 4, the device 400 may include a bus 410, a processor 420, a memory 430, an input component 440, an output component 450, and/or a communication component 460.

The bus 410 may include one or more components that enable wired and/or wireless communication among the components of the device 400. The bus 410 may couple together two or more components of FIG. 4, such as via operative coupling, communicative coupling, electronic coupling, and/or electric coupling. For example, the bus 410 may include an electrical connection (e.g., a wire, a trace, and/or a lead) and/or a wireless bus. The processor 420 may include a central processing unit, a graphics processing unit, a microprocessor, a controller, a microcontroller, a digital signal processor, a field-programmable gate array, an application-specific integrated circuit, and/or another type of processing component. The processor 420 may be implemented in hardware, firmware, or a combination of hardware and software. In some implementations, the processor 420 may include one or more processors capable of being programmed to perform one or more operations or processes described elsewhere herein.

The memory 430 may include volatile and/or nonvolatile memory. For example, the memory 430 may include random access memory (RAM), read only memory (ROM), a hard disk drive, and/or another type of memory (e.g., a flash memory, a magnetic memory, and/or an optical memory). The memory 430 may include internal memory (e.g., RAM, ROM, or a hard disk drive) and/or removable memory (e.g., removable via a universal serial bus connection). The memory 430 may be a non-transitory computer-readable medium. The memory 430 may store information, one or more instructions, and/or software (e.g., one or more software applications) related to the operation of the device 400. In some implementations, the memory 430 may include one or more memories that are coupled (e.g., communicatively coupled) to one or more processors (e.g., processor 420), such as via the bus 410. Communicative coupling between a processor 420 and a memory 430 may enable the processor 420 to read and/or process information stored in the memory 430 and/or to store information in the memory 430.

The input component 440 may enable the device 400 to receive input, such as user input and/or sensed input. For example, the input component 440 may include a touch screen, a keyboard, a keypad, a mouse, a button, a microphone, a switch, a sensor, a global positioning system sensor, an accelerometer, a gyroscope, and/or an actuator. The output component 450 may enable the device 400 to provide output, such as via a display, a speaker, and/or a light-emitting diode. The communication component 460 may enable the device 400 to communicate with other devices via a wired connection and/or a wireless connection. For example, the communication component 460 may include a receiver, a transmitter, a transceiver, a modem, a network interface card, and/or an antenna.

The device 400 may perform one or more operations or processes described herein. For example, a non-transitory computer-readable medium (e.g., memory 430) may store a set of instructions (e.g., one or more instructions or code) for execution by the processor 420. The processor 420 may execute the set of instructions to perform one or more operations or processes described herein. In some implementations, execution of the set of instructions, by one or more processors 420, causes the one or more processors 420 and/or the device 400 to perform one or more operations or processes described herein. In some implementations, hardwired circuitry may be used instead of or in combination with the instructions to perform one or more operations or processes described herein. Additionally, or alternatively, the processor 420 may be configured to perform one or more operations or processes described herein. Thus, implementations described herein are not limited to any specific combination of hardware circuitry and software.

The number and arrangement of components shown in FIG. 4 are provided as an example. The device 400 may include additional components, fewer components, different components, or differently arranged components than those shown in FIG. 4. Additionally, or alternatively, a set of components (e.g., one or more components) of the device 400 may perform one or more functions described as being performed by another set of components of the device 400.

Figure 5:
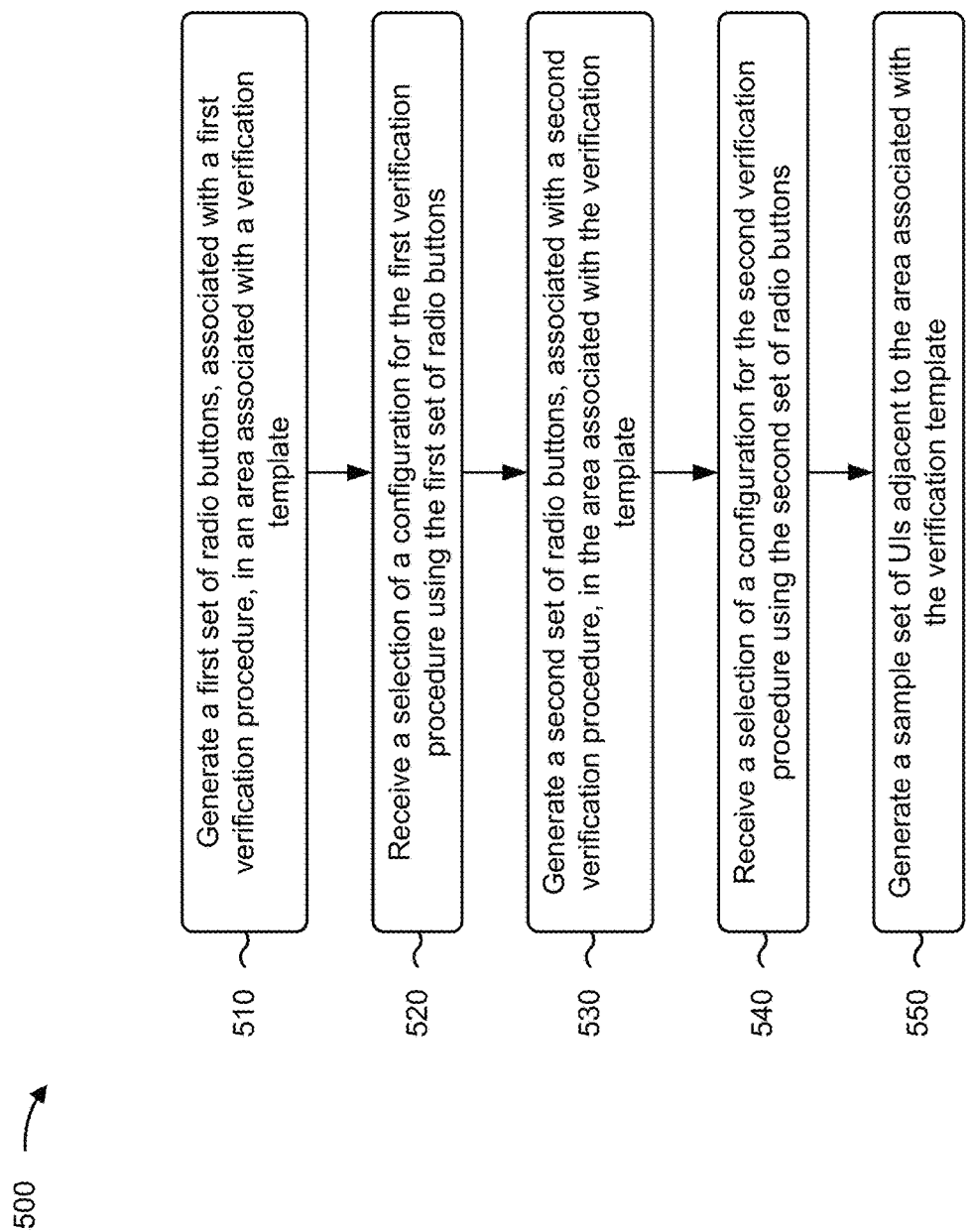
FIG. 5 is a flowchart of an example process relating to programming verification templates visually.

FIG. 5 is a flowchart of an example process 500 associated with programming verification templates visually. In some implementations, one or more process blocks of FIG. 5 may be performed by the verification system 301. In some implementations, one or more process blocks of FIG. 5 may be performed by another device or a group of devices separate from or including the verification system 301, such as the client device 330 and/or the user device 340. Additionally, or alternatively, one or more process blocks of FIG. 5 may be performed by one or more components of the device 400, such as processor 420, memory 430, input component 440, output component 450, and/or communication component 460.

As shown in FIG. 5, process 500 may include generating a first set of radio buttons, associated with a first verification procedure, in an area associated with a verification template (block 510). For example, the verification system 301 (e.g., using processor 420 and/or memory 430) may generate a first set of radio buttons associated with a first verification procedure, as described above in connection with reference number 105 of FIG. 1A.

As further shown in FIG. 5, process 500 may include receiving a selection of a configuration for the first verification procedure using the first set of radio buttons (block 520). For example, the verification system 301 (e.g., using processor 420, memory 430, input component 440, and/or communication component 460) may receive a selection of a configuration for the first verification procedure using the first set of radio buttons, as described above in connection with reference number 110 of FIG. 1A.

As further shown in FIG. 5, process 500 may include generating a second set of radio buttons, associated with a second verification procedure, in the area associated with the verification template (block 530). For example, the verification system 301 (e.g., using processor 420 and/or memory 430) may generate a second set of radio buttons associated with a second verification procedure, as described above in connection with reference number 105 of FIG. 1A.

As further shown in FIG. 5, process 500 may include receiving a selection of a configuration for the second verification procedure using the second set of radio buttons (block 540). For example, the verification system 301 (e.g., using processor 420, memory 430, input component 440, and/or communication component 460) may receive a selection of a configuration for the second verification procedure using the second set of radio buttons, as described above in connection with reference number 110 of FIG. 1A.

As further shown in FIG. 5, process 500 may include generating a sample set of UIs adjacent to the area associated with the verification template (block 550). For example, the verification system 301 (e.g., using processor 420 and/or memory 430) may generate a sample set of UIs adjacent to the area associated with the verification template, as described above in connection with reference number 115 of FIG. 1B.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel. The process 500 is an example of one process that may be performed by one or more devices described herein. These one or more devices may perform one or more other processes based on operations described herein, such as the operations described in connection with FIGS. 1A-1F and/or 2A-2E.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A system for providing a visual interface for programming verification templates, the system comprising:
   one or more memories; and
   one or more processors, communicatively coupled to the one or more memories, configured to:
      generate a first set of radio buttons associated with a first verification procedure;
      provide the first set of radio buttons in an area associated with a verification template;
      receive a selection of a configuration for the first verification procedure using the first set of radio buttons;
      generate a second set of radio buttons associated with a second verification procedure;
      provide the second set of radio buttons in the area associated with the verification template;
      receive a selection of a configuration for the second verification procedure using the second set of radio buttons;
      generate a sample set of user interfaces (UIs) based on the selection of the configuration for the first verification procedure and the selection of the configuration for the second verification procedure;
      provide the sample set of UIs adjacent to the area associated with the verification template;
      receive an interaction with an element of the sample set of UIs; and
      modify the sample set of UIs based on the interaction.

2. The system of claim 1, wherein the first verification procedure is based on information associated with and entered by a user.

3. The system of claim 1, wherein the second verification procedure is based on biometric data associated with a user.

4. The system of claim 1, wherein the one or more processors are further configured to:
   receive an additional interaction with an additional element of the sample set of UIs; and
   transmit a message to a sample user device based on the additional interaction.

5. The system of claim 4, wherein the message includes a code for entry into the sample set of UIs.

6. The system of claim 4, wherein the message includes a link that directs the sample user device to an additional sample set of UIs.

7. A method of providing a visual interface for programming verification templates, comprising:
   generating, by a verification device, a first set of radio buttons associated with a first verification procedure;
   providing, by the verification device, the first set of radio buttons in an area associated with a verification template;
   receiving, at the verification device, a selection of a configuration for the first verification procedure using the first set of radio buttons;
   generating, by the verification device, a second set of radio buttons associated with a second verification procedure;
   providing, by the verification device, the second set of radio buttons in the area associated with the verification template;
   receiving, at the verification device, a selection of a configuration for the second verification procedure using the second set of radio buttons;
   generating, by the verification device, instructions for generating a set of user interfaces (UIs) based on the selection of the configuration for the first verification procedure and the selection of the configuration for the second verification procedure; and
   transmitting, to a user device, at least a portion of the instructions for generating the set of UIs.

8. The method of claim 7, further comprising:
   generating a plurality of visual elements, where each of the plurality of visual elements is associated with a corresponding country from a plurality of countries; and
   receiving an indication to associate the verification template with a selected country from the plurality of countries based on a selection of a visual element of the plurality of visual element.

9. The method of claim 8, further comprising:
   determining that a location of the user device is associated with the selected country from the plurality of countries, wherein the portion of the instructions for generating the set of UIs are transmitted to the user device based on the location of the user device being associated with the selected country.

10. The method of claim 8, further comprising:
receiving an indication of a location of the user device,
wherein the portion of the instructions for generating the set of UIs are transmitted to the user device based on the location of the user device being associated with the selected country.

11. The method of claim 8, further comprising:
generating one or more additional visual input elements associated with the first verification procedure based on interaction with one of the plurality of visual elements; and
modifying the first verification procedure associated with the verification template based on interaction with the one or more additional visual input elements.

12. The method of claim 8, further comprising:
generating one or more additional visual input elements associated with the second verification procedure based on interaction with one of the plurality of visual elements; and
modifying the second verification procedure associated with the verification template based on interaction with the one or more additional visual input elements.

13. The method of claim 7, further comprising:
transmitting, to an additional user device, at least one additional portion of the instructions for generating the set of UIs.

14. A non-transitory computer-readable medium storing a set of instructions for providing a visual interface for programming verification templates, the set of instructions comprising:
one or more instructions that, when executed by one or more processors of a device, cause the device to:
generate a first set of radio buttons associated with a first verification procedure;
provide the first set of radio buttons;
receive a selection of a configuration for the first verification procedure using the first set of radio buttons;
generate a second set of radio buttons associated with a second verification procedure;
provide the second set of radio buttons;
receive a selection of a configuration for the second verification procedure using the second set of radio buttons; and
transmit, to a user device, instructions for generating a set of user interfaces (UIs) based on the selection of the configuration for the first verification procedure and the selection of the configuration for the second verification procedure.

15. The non-transitory computer-readable medium of claim 14, wherein the one or more instructions, when executed by the one or more processors, further cause the device to:
receive a name associated with the selection of the configuration for the first verification procedure and the selection of the configuration for the second verification procedure; and
store the instructions for generating the set of UIs in association with the name to permit the instructions for generating the set of UIs to be obtained based on the name.

16. The non-transitory computer-readable medium of claim 14, wherein the one or more instructions, when executed by the one or more processors, further cause the device to:
generate one or more visual input elements associated with the first verification procedure;
provide the one or more visual input elements;
generate a modification to the instructions for generating the set of UIs based on interaction with the one or more visual input elements;
receive a name associated with the modification to the instructions for generating the set of UIs; and
store the modification to the instructions for generating the set of UIs in association with the name.

17. The non-transitory computer-readable medium of claim 14, wherein the one or more instructions, that cause the device to transmit the instructions to the user device, cause the device to:
receive, from the user device, a request for verification;
transmit a first portion of the instructions to the user device in response to the request;
receive, from the user device, an indication of one or more interactions with a UI, of the set of UIs, based on the first portion of the instructions; and
transmit a second portion of the instructions to the user device based on the indication of the one or more interactions.

18. The non-transitory computer-readable medium of claim 14, wherein the one or more instructions, that cause the device to transmit the instructions to the user device, cause the device to:
receive, from the user device, a request for verification;
transmit a first portion of the instructions to the user device in response to the request;
receive, from the user device, an indication of one or more interactions with a UI, of the set of UIs, based on the first portion of the instructions; and
transmit a second portion of the instructions to an additional user device based on the indication of the one or more interactions.

19. The non-transitory computer-readable medium of claim 14, wherein the one or more instructions, when executed by the one or more processors, further cause the device to:
determine that a location of the user device is associated with a country that is associated with the set of UIs,
wherein the instructions for generating the set of UIs are transmitted to the user device based on the location of the user device being associated with the country.

20. The non-transitory computer-readable medium of claim 14, wherein the one or more instructions, when executed by the one or more processors, further cause the device to:
receive an indication of a location of the user device,
wherein the instructions for generating the set of UIs are transmitted to the user device based on the location of the user device being associated with a country that is associated with the set of UIs.

* * * * *